Dec. 1, 1925.    1,563,960
J. B. BROCKHURST
NONSKID DEMOUNTABLE TREAD FOR VEHICLE WHEELS
Filed April 28, 1921    2 Sheets-Sheet 1

Inventor
JAMES B. BROCKHURST
By his Attorney

Dec. 1, 1925.                                                       1,563,960
J. B. BROCKHURST
NONSKID DEMOUNTABLE TREAD FOR VEHICLE WHEELS
Filed April 28, 1921           2 Sheets-Sheet 2
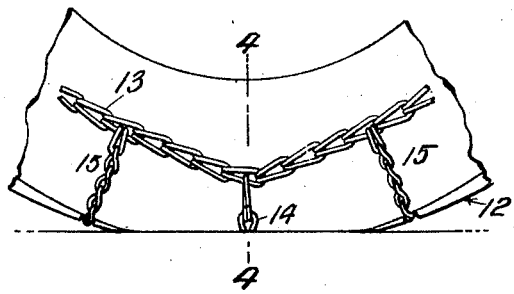
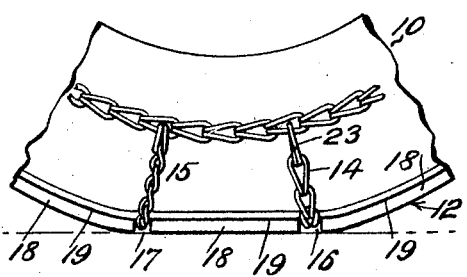
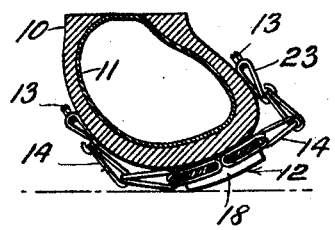
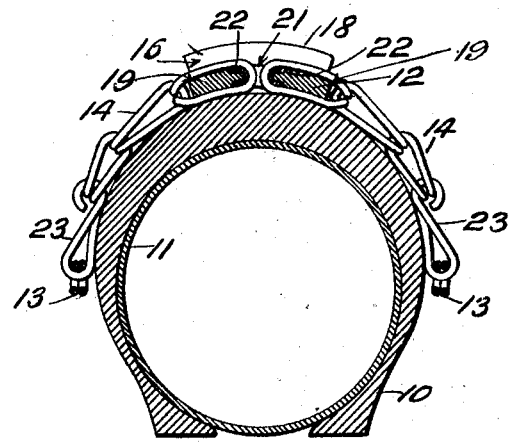
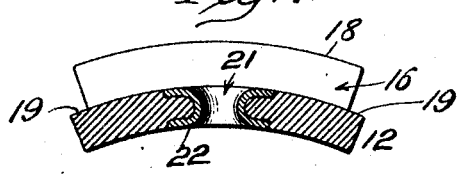
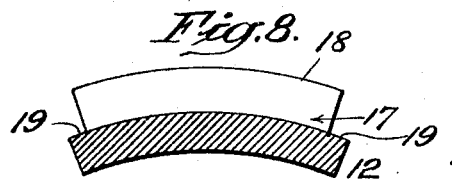
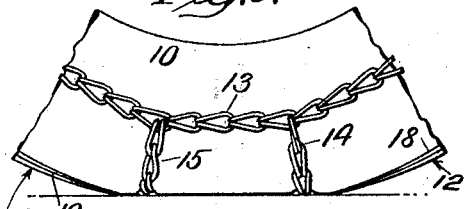
Inventor
JAMES B. BROCKHURST
By his Attorney Patented Dec. 1, 1925.

1,563,960

UNITED STATES PATENT OFFICE.

JAMES B. BROCKHURST, OF RED BANK, NEW JERSEY.

NONSKID DEMOUNTABLE TREAD FOR VEHICLE WHEELS.

Application filed April 28, 1921. Serial No. 465,281.

*To all whom it may concern:*

Be it known that I, JAMES B. BROCKHURST, a citizen of the United States, and a resident of Red Bank, in the county of Monmouth and State of New Jersey, have invented certain new and useful Improvements in Nonskid Demountable Treads for Vehicle Wheels, of which the following is a specification.

The invention relates to the tires of wheels of the character employed for automobiles and other motor vehicles, and resides in a novel non-skid demountable unitary tread structure which may be applied to or over the usual casing of a pneumatic tire.

The principal object of my invention is to provide in one self-contained or unitary structure, for the tire casing of an automobile wheel, a distinctive crown band or tread of approximately normal and uniform traction width throughout which is in contact with the roadbed during normal forward traction, transversely extending nonskid elements or chains which are out of contact with the roadbed during normal forward traction and which are thrown into operative engagement with the roadbed during intervals of lateral stress thereon, and means for positioning the crown band and transverse non-skid elements on the tire casing in a manner permitting them to properly function in effectuating the purposes of my invention, as hereinafter explained.

Another object is to provide a tread which will be an integral, a complete and independent unit from the casing and which will be mounted directly on the casing and which may be demounted therefrom for replacement or repair.

Another object is to provide a simple, cheap and practical means for holding the tread in position on the casing.

Another object is to provide a means for regulating the relative movement of the tread on the tire.

Another object is to provide a tread that will conform with the present engineering principles of tire construction.

A further object of the invention is to provide an efficient integral or unitary crown band of approximately normal traction width which will leave the sides of the tire casing freely exposed to the atmosphere, thereby avoiding undue heating of the walls of the casing and the injurious consequences which would result therefrom, during the travel of the wheel.

As explanatory of my invention I present herein a preferred embodiment thereof, without limiting myself however to the details of form and construction described further than the appended claims may require, it being my desire to receive adequate protection for my invention.

The embodiment of my invention herein presented comprises an endless peripheral band or tread demountably applied on the peripheral crown of the tire casing and to engage the road-bed, endless chains at the opposite sides of said casing and closely engaging the same and transverse chains crossing said band or tread and secured at their ends to said endless side chains, said transverse chains in cooperation with the side chains serving to bind the peripheral band or tread in position on the crown of the tire casing. The demountable band or tread is transversely grooved to increase traction effect and particularly to receive the transverse chains and keep them from engaging the road-bed during the normal travel of the vehicle. Alternate transverse chains are preferably directly fastened to the band or tread, while the other alternate transverse chains frictionally engage said band or tread within the grooves thereof occupied by them and also at the ends of said grooves, and all of the chains made use of frictionally engage the tire-casing. On a lateral distortion of the tire casing due to lateral stress, on a tendency of the wheel to skid, the demountable band or tread is carried laterally from traction alignment and the transverse chains then engage the road-bed and prevent skidding.

The invention will be fully uderstood from the detailed description hereinafter presented, reference being had to the accompanying drawings, in which:

Fig. 3 is a side elevation of a portion of the tire-casing and the tread of my invention and illustrates the tire as under a lateral distortion which takes place on a tendency of the wheel to skid, the crown tread being shown as forced out of traction alignment and the securing chains as brought into contact with the road-bed to prevent skidding;

Fig. 4 is a vertical transverse section of the same taken on the dotted line 4—4 of Fig. 3;

Fig. 5 is a side elevation of a portion of the tire-casing equipped with the tread of my invention and illustrates the tire in the usual condition thereof during normal forward traction on a road-bed, the securing chains being at this period free of or out of contact with the road-bed and consequently not cutting into or injuring said bed;

Fig. 6 is a transverse section of the tire equipped with the demountable tread of my invention, taken on the dotted line 6—6 of Fig. 1;

Fig. 7 is a transverse section through the tread of my invention taken on the dotted line 7—7 of Fig. 2, the chain being omitted;

Fig. 8 is a like section of the same taken on the dotted line 8—8 of Fig. 2, and Fig. 9 is a side view showing a further non-skid position of the tread.

Figure 1:
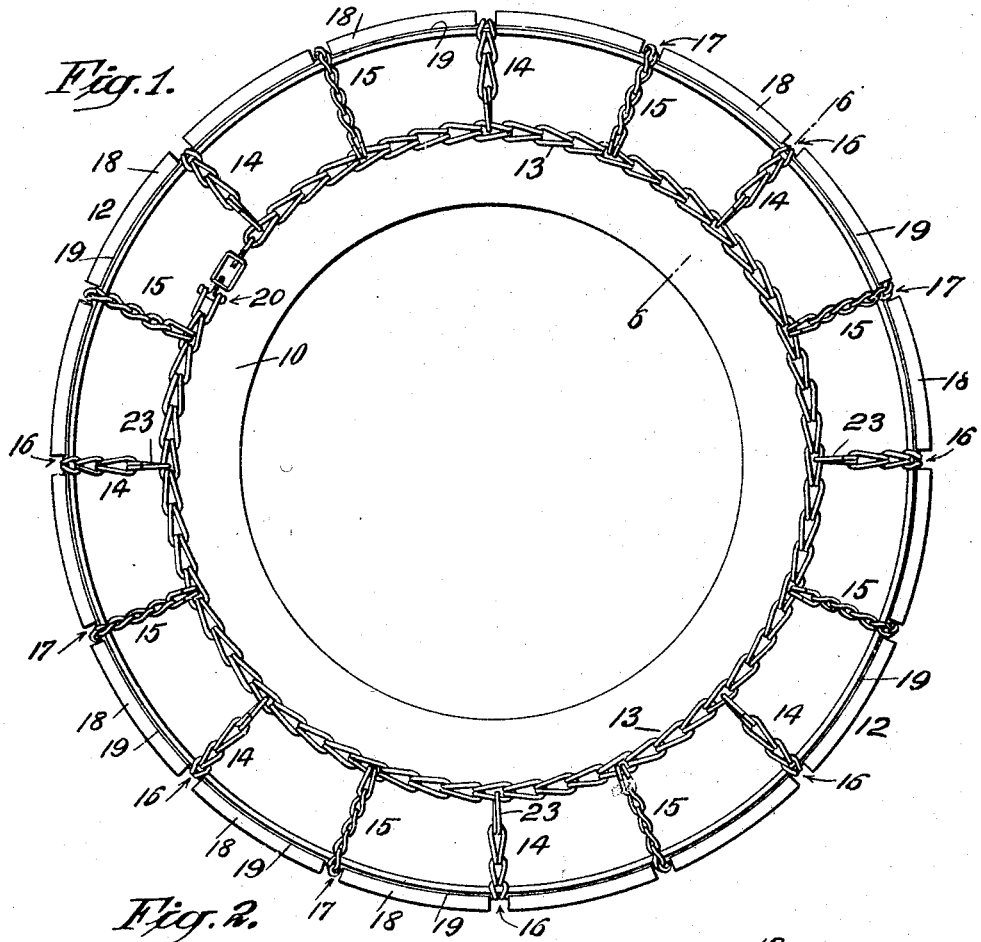
Fig. 1 is a side elevation of the tire portion of a wheel equipped with a demountable tread embodying my invention.

In the drawings 10 designates the usual tire casing or shoe of an automobile wheel and 11 the pneumatic tube, and these features of the tire construction I do not modify in any respect, my invention residing in a demountable non-skid tread which I apply to or upon said tire casing.

The non-skid tread of my invention comprises an endless flexible band 12, usually formed of the same material as the peripheral crown portion of the tire-casing, endless side chains 13 and transverse chains 14, 15 connected at their ends with the side chains 13, the alternate chains, 14, being fastened to the band or tread 12, while the chains 15 alternating with the chains 14 have when in use a frictional engagement with said band or tread.

The endless band of tread 12 will be of suitable thickness to effectually serve its purposes, and said band or tread is applied upon the peripheral crown portion only of the tire casing, as shown in Fig. 6, said band being comparatively narrow but broad enough to serve as the tread for the wheel and at the same time leave the sides of the tire casing exposed and free to have their natural movements under the varying stresses which come upon wheel tires of the character under consideration in actual service. The band or tread 12 has a concave inner face, as shown in Figs. 7 and 8, to fit closely against the convex peripheral crown of the tire casing and a convex outer face to engage the road-bed. The crown band 12 being of the same material as the peripheral crown portion of the tire-casing and conforming to present engineering principles of tire construction, is non-malleable in that it will not roll out and elongate under its rolling action against the roadbed and hence will not become of oversize and thereby have its usefulness impaired.

The band or tread 12 is formed with a series of equally spaced-apart transverse grooves 16, 17 extending entirely around the band or tread and being of sufficient width to snugly receive the chains 14, 15 and of proper depth to keep said chains from destructive action on the road-bed during the normal travel of the wheel, as I illustrate in Figs. 5 and 6. It is one of the purposes of my invention that the chains 14, 15 shall remain normally free of the road-bed and thus permit the use of my non-skid demountable tread at all times if desired. Those outwardly projecting portions of the band or tread 12 between the transverse grooves 16, 17 constitute segmental sections 18 which afford ample and efficient traction surfaces. The segmental sections 18 do not extend out to the lateral side edges of the band or tread 12 and hence there are formed at said edges continuous laterally projecting shoulders 19, whose upper surfaces are continuous with the base surfaces of the grooves 16, 17, as shown in Figs. 7 and 8.

The band or tread 12 is an integral structure and I consider the outer circumferential portion of this band or tread, in this instance represented by the segments 18, as the wear element, and the base portion of said band or tread on which are the shoulders 19 and which is at the base of the grooves 16, 17, I consider to be the reinforcement element of the tread. The said base portion being of the well known tire construction is of course very durable and being formed in one piece with the wear element serves to reinforce or add durability and stability to said wear element.

The side chains 13 will be formed of any suitable character of links, the links shown for these chains being a preferred form, and in each of the chains 13 a turn-buckle 20 will be incorporated (Fig. 1), this turn-buckle serving as means for connecting the ends of the chain and also to tighten or adjust the chains 13 against the sides of the tire casing.

The chains 15 are in continuous lengths and at their ends are hooked to the links of the chains 13 in any convenient manner. The chains 15 have a frictional connection with the band or tread 12 within the grooves 17, not being permanently fastened to said tread or band.

Figure 2:
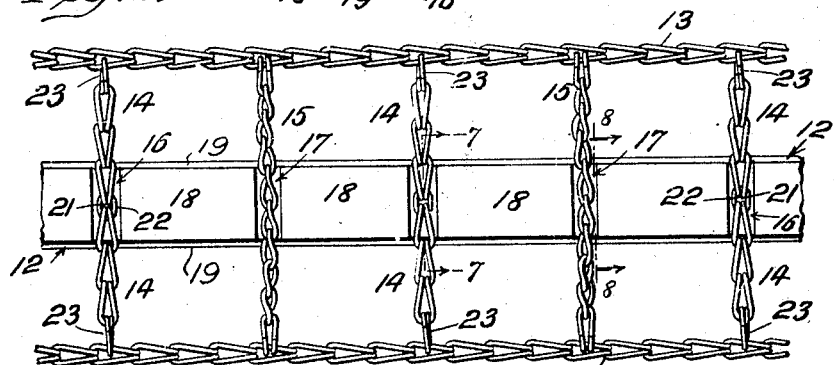
Fig. 2 is a plan view of a portion of the demountable tread of my invention.

The transverse chains 14 are each in two corresponding sections, as shown in Figs. 2 and 6, whose inner ends are brought into close relation to each other and secured to the band or tread 12 at openings or holes 21 formed therein at the base of the grooves 16 and which openings or holes are preferably reinforced by metal eyelets 22 (Fig. 7). The inner end links of the sections or members of the chains 14 extend through the holes 21 and at their upper and lower sides embrace the thickness of the band or tread 12 from said holes 21 outwardly to the side edges of said band or tread, thereby establishing a very firm connection of the chains to the band or tread. The outer ends of the chains 14 are by means of hook-links 23 or other suitable devices connected with the links of the chains 13. The chains 14, 15 are both connected with the chains 13 and the chains 14 are fastened to the band or tread 12, while the chains 15 are not permanently secured to said band or tread.

The several parts of my non-skid demountable tread are all connected together and may be handled as a unit, and the method of applying the same to and removing the same from the tire-casing is apparent. The crown band or tread, transverse chains 14, 15 and chains 13 are applied upon the tire casing as one complete unitary structure and secured thereupon in proper relation to said casing by tightening the turnbuckles 20. It is to be noted that when the tire casing is to be removed from the rim of the wheel and the inner tube is to be removed from the casing, the crown band or tread and the positioning means therefor, to wit: chains 13, 14, 15, remain undisturbed and are intact and in position on the casing as when the casing was originally upon the rim of the wheel. There is no necessary disarrangement of the parts of my unitary tread structure when the tire casing is removed from the rim. The turnbuckles 20 perform important duties in respect to my invention in that they through tensioning the tread against the tire casing, proportion, as closely as may be, the friction of the tread against the casing to the friction of said tread against the roadbed. The lateral movement of the aforesaid crown band or tread on the tire casing is also controlled through the turnbuckle tension adjustment of the yield of the side chains 13. The adjustment of the distortive yielding of the chains 13 is utilized to definitely secure and resiliently control the desired lateral movements of the crown band or tread on the tire casing. In the respects just indicated, as well as in other respects, the turn-buckles 20 are of very great importance and perform definite duties with respect to and as a part of the unitary structure of my invention.

In use the band or tread 12 covers the peripheral crown of the tire casing and hence is normally in traction alignment and avoids wear on or injury to the tire casing and also materially lessens the danger of the pneumatic tube being punctured. During the normal travel of the wheel the traction segments 18 engage the road-bed and keep the chains 14 15 out of destructive contact with the road-bed, said chains being at such time at the base of the grooves 16, 17. During the normal travel of the wheel the chains 13, 14, 15 serve the important duty of positioning the band or tread 12 on the peripheral crown of the tire casing, the securing of the chains and tread to the tire casing being frictional and adjustable and said chains and tread leaving the tire casing exposed to the atmosphere and free to yield in a natural manner to such stresses as may come upon it during use.

In the event of skidding or starting to skid, the tire casing by the lateral stress engendered against it is distorted sideways or to the condition illustrated in Figs. 3 and 4, and at this time the band or tread 12 is carried out of traction alignment and the transverse chains at one end or the other of the grooves 16, 17 engage the road-bed and serve to stop the skidding tendency. The transverse chains are anti-skid devices and serve as such only when necessary, and at all times said chains maintain the band or tread 12 on the tire casing 10. When the tire casing 10 is distorted laterally, as indicated in Figs. 3 and 4, there is an outward pull exerted against one end portion of the transverse chains affected and a lessening of the tension on the other end portion of the same chains, but since the chains 14 are fastened to the band or tread 12 said band or tread cannot escape from the tire casing or shoe, and in the restoration of the tire casing to normal condition the end portions of the chains 14 which were pulled against will be automatically drawn or forced back to position and automatically restore that portion of the band or tread 12 which became affected, to its traction alignment position, the friction chains 15 also taking their normal position. The band 12 by reason of its segmental sections 18 tends to check skidding and said band serves as an efficient traction tread.

It is to be noticed that the demountable tread 12 occupies only the peripheral crown surface of the tire casing 10 and leaves the sides of said casing exposed to the atmosphere and free to have proper flexing actions or movements during the travel of the wheel, and this feature of the invention is one of practical importance, since under the normal flexing action of the walls of the tire casing heat is generated in sufficient degree to eventually break down the structure of the casing should said heat be confined and retained. In my construction the heat generated in the walls of the casing 10 is constantly thrown off, since the sides of the casing are at all times exposed to the atmosphere.

The non-skid tread of my invention may be applied to tire casings which have become worn or injured by use and also to new tire casings, being of great benefit in either case.

What I claim as my invention and desire to secure by Letters Patent, is:

1. A non-skid demountable tread for the tire casings of vehicle wheels comprising a tread of approximate normal traction width adapted to be applied upon and extend circumferentially around the periphery of the tire casing and to engage the roadbed during normal forward traction, non-skid members engaged with said tread and adapted to extend transversely therefrom along portions of the opposite sides of said casing out of contact with the roadbed during normal forward traction and to be thrown into operative engagement with the roadbed during intervals of lateral stress on the tire casing shifting said tread from its normal relation to the roadbed, and flexible tensioning members to which the outer ends of said non-skid members are connected and which are adapted to extend along and upon the opposite sides of said casing, the tightening of said tensioning members serving to bind said tread against the tire casing and the extent of distortive yielding permitted in said members under lateral stresses serving to control the lateral movements of said tread on the tire casing.

2. A non-skid demountable tread for the tire casings of vehicle wheels as claimed in claim 1, in which said tread has an outer wear element superposed on and integral with a reinforcement element which is concaved to fit against the periphery of the tire casing.

3. A non-skid demountable tread for the tire casings of vehicle wheels as claimed in claim 1, in which said tread is transversely grooved and in which said non-skid members comprise two series of chains, one series lying within alternate grooves of and frictionally engaging the tread and the other series being in the other grooves and securely fastened to the tread.

Signed at Red Bank, in the county of Monmouth and State of New Jersey, this 25th day of April, A. D. 1921.

JAMES B. BROCKHURST.